(12) United States Patent
Na et al.

(10) Patent No.: US 10,067,939 B2
(45) Date of Patent: Sep. 4, 2018

(54) MACHINE TRANSLATION METHOD AND APPARATUS

(71) Applicant: Samsung Electronics Co., Ltd., Suwon-si (KR)

(72) Inventors: Hwidong Na, Suwon-si (KR); Hoshik Lee, Seongnam-si (KR); Young Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/401,126

(22) Filed: Jan. 9, 2017

(65) Prior Publication Data
US 2018/0052828 A1 Feb. 22, 2018

(30) Foreign Application Priority Data
Aug. 16, 2016 (KR) .......................... 10-2016-0103638

(51) Int. Cl.
*G06F 17/28* (2006.01)
*G10L 25/30* (2013.01)

(52) U.S. Cl.
CPC ............ *G06F 17/289* (2013.01); *G10L 25/30* (2013.01)

(58) Field of Classification Search
USPC ............ 704/1–10, 270, 277, 230–257, 270.1
See application file for complete search history.

(56) References Cited

U.S. PATENT DOCUMENTS

| | | | |
|---|---|---|---|
| 8,145,473 B2 * | 3/2012 | Anisimovich | G06F 17/2755 704/2 |
| 8,204,739 B2 | 6/2012 | Waibel et al. | |
| 8,234,106 B2 | 7/2012 | Marcu et al. | |
| 8,412,513 B2 | 4/2013 | Anisimovich et al. | |
| 8,504,354 B2 | 8/2013 | Quirk et al. | |
| 8,977,953 B1 | 3/2015 | Pierre et al. | |
| 9,037,449 B2 | 5/2015 | Kim et al. | |

(Continued)

FOREIGN PATENT DOCUMENTS

| | | |
|---|---|---|
| JP | 2002-91278 A | 3/2002 |
| JP | 2006-31511 A | 2/2006 |

(Continued)

OTHER PUBLICATIONS

Gregor, Karol, et al. "DRAW: A Recurrent Neural Network for Image Generation." Proceedings of the 32$^{nd}$ International Conference on Machine, Lille, France, Jul. 6, 2015-Jul. 11, 2015, previously published at arXiv:1502.04623v2 [cs.CV] May 20, 2015. (10 pages in English).

(Continued)

*Primary Examiner* — Huyen Vo
(74) *Attorney, Agent, or Firm* — NSIP Law

(57) ABSTRACT

A machine translation method includes converting a source sentence written in a first language to language-independent information using an encoder for the first language, and converting the language-independent information to a target sentence corresponding to the source sentence and written in a second language different from the first language using a decoder for the second language. The encoder for the first language is trained to output language-independent information corresponding to the target sentence in response to an input of the source sentence.

20 Claims, 6 Drawing Sheets

검은 옷을 입은 남자가 기타를 치고 있다.

A man in a black shirt is playing a guitar.

(56) References Cited

U.S. PATENT DOCUMENTS

| | | |
|---|---|---|
| 2007/0203869 A1 | 8/2007 | Ramsey et al. |
| 2009/0157407 A1* | 6/2009 | Yamabe .............. G06F 17/2785 |
| | | 704/260 |
| 2010/0023315 A1 | 1/2010 | Quirk |
| 2013/0030788 A1 | 1/2013 | Barbosa et al. |
| 2013/0084976 A1 | 4/2013 | Kumaran et al. |
| 2013/0103390 A1 | 4/2013 | Fujita et al. |
| 2014/0163962 A1 | 6/2014 | Castelli et al. |
| 2015/0066477 A1 | 3/2015 | Hu |
| 2015/0127319 A1 | 5/2015 | Hwang et al. |
| 2015/0278197 A1* | 10/2015 | Bogdanova ......... G06F 17/2785 |
| | | 704/9 |
| 2015/0356401 A1* | 12/2015 | Vinyals .................... G06N 3/02 |
| | | 706/15 |
| 2016/0004707 A1 | 1/2016 | Hakkani-Tur et al. |
| 2016/0071022 A1 | 3/2016 | Bruno et al. |

FOREIGN PATENT DOCUMENTS

| | | |
|---|---|---|
| JP | 4043176 B2 | 11/2007 |
| JP | 4371080 B2 | 9/2009 |
| JP | 2011-118814 A | 6/2011 |

OTHER PUBLICATIONS

Xu, Kelvin, et al. "Show, Attend and Tell: Neural Image Caption Generation with Visual Attention." arXiv:1502.03044v3 [cs.LG] Apr. 19, 2016 (22 pages in English).

* cited by examiner

검은 옷을 입은 남자가 기타를 치고 있다. ―110

A man in a black shirt is playing a guitar. ―130

MACHINE TRANSLATION METHOD AND APPARATUS

CROSS-REFERENCE TO RELATED APPLICATIONS

This application claims the benefit under 35 USC 119(a) of Korean Patent Application No. 10-2016-0103638 filed on Aug. 16, 2016, in the Korean Intellectual Property Office, the entire disclosure of which is incorporated herein by reference for all purposes.

BACKGROUND

1. Field

The following description relates to a machine translation method and apparatus.

2. Description of Related Art

Due to development of the Internet and information telecommunication (IT) technologies, people receive content provided in various languages. Also, with globalization in business, interpretation and translation technologies for a content translation and communication among users who speak various languages are rapidly developing.

To translate one language into another language, predetermined data may be used. However, the data may be insufficient depending on the circumstances.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a machine translation method includes converting a source sentence written in a first language to language-independent information using an encoder for the first language; and converting the language-independent information to a target sentence corresponding to the source sentence and written in a second language different from the first language using a decoder for the second language; wherein the encoder for the first language is trained to output language-independent information corresponding to the target sentence in response to an input of the source sentence.

The converting of the source sentence to the language-independent information may include converting the source sentence to language-independent information having a similarity to the language-independent information corresponding to the target sentence higher than a preset threshold.

The encoder for the first language may be further trained to encode a first training sentence included in parallel corpus data in the first language and the second language to output training language-independent information; and the training language-independent information may correspond to information output by encoding a second training sentence included in the parallel corpus data in an encoder for the second language, the second training sentence corresponding to the first training sentence.

The decoder for the second language may be trained to output the second training sentence in response to an input of the training language-independent information from the encoder for the first language.

The language-independent information to which the source sentence is converted may include any one or any combination of audio, video, brainwaves, and images corresponding to the source sentence.

The encoder for the first language and the decoder for the second language may be implemented by one or more processors.

In another general aspect, a non-transitory computer-readable storage medium stores instructions that, when executed by a processor, cause the processor to perform the method described above.

In another general aspect, a machine translation method includes converting a source sentence written in a first language to first language-independent information associated with the first language using an encoder for the first language; converting the first language-independent information to second language-independent information associated with a second language different from the first language using a decoder for language-independent information; and converting the second language-independent information to a target sentence corresponding to the source sentence and written in the second language using a decoder for the second language.

The second language-independent information may correspond to language-independent information output by encoding the target sentence in an encoder for the second language.

The decoder for language-independent information may be trained to output second training language-independent information associated with the second language in response to an input of first training language-independent information associated with the first language, the second training language-independent information corresponding to the first training language-independent information; the first training language-independent information may be language-independent information output by encoding a first training sentence included in parallel corpus data in the first language and the second language in the encoder for the first language; and the second training language-independent information may be language-independent information output by encoding a second training sentence included in the parallel corpus data in an encoder for the second language, the second training sentence corresponding to the first training sentence.

The first language-independent information may include a set, a permutation or a structured form of any one or any combination of any two or more of audio, video, brainwaves, and images corresponding to the source sentence.

The encoder for the first language, the decoder for language-independent information, and the decoder for the second language may be implemented by one or more processors.

In another general aspect, a machine translation apparatus includes a memory storing information to implement an encoder for a first language and a decoder for a second language different from the first language; and a processor configured to implement the encoder for the first language and the decoder for the second language based on the information stored in the memory, and translate a source sentence written in the first language into a target sentence written in the second language using the encoder for the first language and the decoder for the second language; wherein the processor is further configured to convert the source sentence to language-independent information using the encoder for the first language, and convert the language-independent information to the target sentence using the decoder for the second language, the target sentence corresponding to the source sentence; and the encoder for the first language is trained to output language-independent information corresponding to the target sentence in response to an input of the source sentence.

The processor may be further configured to convert the source sentence to language-independent information having a similarity to the language-independent information corresponding to the target sentence higher than a preset threshold.

The encoder for the first language may be further trained to encode a first training sentence included in parallel corpus data in the first language and the second language to output training language-independent information; and the training language-independent information may correspond to language-independent information output by encoding a second training sentence included in the parallel corpus data in an encoder for the second language, the second training sentence corresponding to the first training sentence.

The decoder for the second language may be trained to output the second training sentence corresponding to the first training sentence in response to an input of the training language-independent information from the encoder for the first language.

The language-independent information to which the source sentence is converted may include any one or any combination of any two or more of audio, video, brainwaves, and images corresponding to the source sentence.

The information stored in the memory may include a first neural network for the encoder for the first language; a second neural network for the decoder for the second language; first parameters for the first neural network; and second parameters for the second neural network; and the processor may be further configured to implement the encoder for the first language based on the first neural network and the first parameters, and implement the encoder for the second language based on the second neural network and the second parameters.

Each of the first neural network and the second neural network may stored in the memory as an executable object file or an execution file.

In another general aspect, a machine translation method includes encoding a source sentence written in a first language using an encoder for the first language to obtain a non-language representation of the source sentence; and decoding the non-language representation of the source sentence using a decoder for a second language different from the first language to obtain a target sentence written in the second language and having substantially a same meaning as the source sentence; wherein the encoder for the first language is trained so that the non-language representation of the source sentence is substantially similar to a non-language representation of the target sentence.

A similarity of the non-language representation of the source sentence to the non-language representation of the target sentence may be higher than a preset threshold.

The non-language representation of the source sentence may include an image illustrating a content of the source sentence; and the non-language representation of the target sentence may include an image illustrating a content of the target sentence.

The similarity may be determined based on a mean square error, a Euclidean distance, or a Kullback-Leibler divergence calculated based on differences between pixel values of the image illustrating the content of the source sentence and pixel values of the image illustrating the content of the target sentence.

Other features and aspects will be apparent from the following detailed description, the drawings, and the claims.

BRIEF DESCRIPTION OF THE DRAWINGS

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

Figure 1:
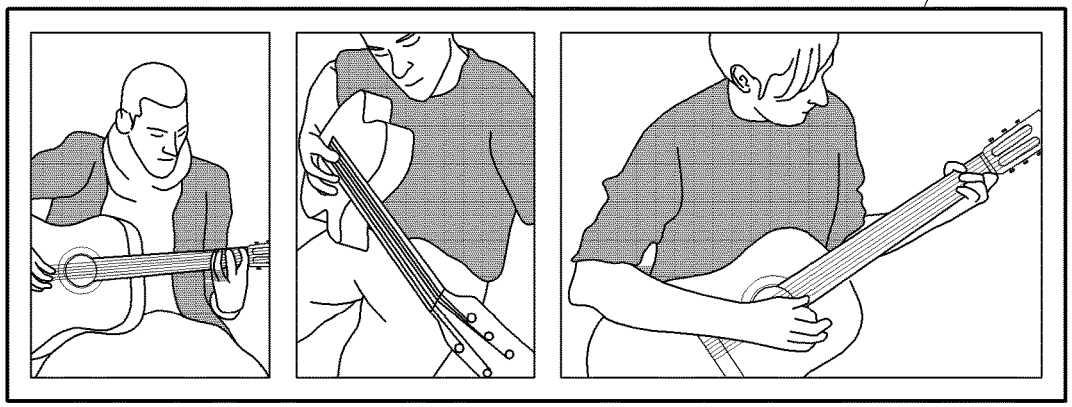
FIG. 1 illustrates an example of an operating principle of a machine translation method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although the terms "first" and "second" may be used to refer to various elements in this application, the elements are not limited to these terms. These terms should be used only to distinguish one element from another element. For example, a "first" element alternatively may be referred to as a "second" element, and a "second" element alternatively may be referred to as a "first" element within the scope of the disclosure of this application.

When an element is referred to as being "connected to" another element, the component may be directly connected or coupled to the other element, or intervening components may be present between the two elements.

As used herein, the singular forms are intended to include the plural forms as well, unless the context clearly indicates otherwise. The terms "comprise," "include," and "have," when used in this application, specify the presence of stated features, numbers, operations, elements, components, or combinations thereof, but do not preclude the presence or addition of one or more other features, numbers, operations, elements, components, or combinations thereof.

Unless otherwise defined herein, all terms used herein, including technical or scientific terms, have the same meanings as those generally understood by one of ordinary skill in the art to which the disclosure of this application pertains. Terms defined in general-use dictionaries are to be interpreted as having meanings that are consistent with their meanings in the relevant art, and are not to be interpreted in an idealized or overly formal sense unless expressly so defined herein.

The following description includes examples that may be used to perform translation from a first language to a second language. The examples may be implemented in various types of products, for example, personal computers (PC), laptop computers, tablet computers, smartphones, wearable devices, smart home appliances, and intelligent vehicles. For example, the examples may be used to perform translation in a smartphone, a mobile device, or a wearable device.

FIG. 1 illustrates an example of an operating principle of a machine translation method.

FIG. 1 illustrates an example of a process of translating a source sentence 110 into a target sentence 130 based on language-independent information 120 in a machine translation apparatus.

The source sentence 110 is written in a first language, and is, for example, a sentence to be translated through a machine translation. The source sentence 110 is "검은 옷을 입은 남자가 기타를 치고 있다" as shown in FIG. 1.

The machine translation apparatus converts the source sentence 110 to the language-independent information 120. The language-independent information 120 is information that is not expressed in letters of a predetermined language, and includes, for example, any one or any combination of any two or more of audio, video, brainwaves, and images. In FIG. 1, the language-independent information 120 includes at least one image corresponding to the source sentence 110. Hereinafter, for convenience of explanation, the language-independent information 120 will be described with respect to an image. However, the following description is also applicable to a case in which the language-independent information is one of video, audio, and brainwaves.

Also, the machine translation apparatus converts the language-independent information 120 to the target sentence 130. The target sentence 130 is written in a second language and represents a machine translation result of the source sentence 110. The target sentence 130 is, for example, a sentence that expresses the source sentence 110 in the second language. The target sentence 130 is "A man in a black shirt is playing a guitar." as shown in FIG. 1.

In FIG. 1, the source sentence 110 and the target sentence 130 express the language-independent information 120 using different languages. The source sentence 110 and the target sentence 130 that have the same meaning even though the source sentence 110 and the target sentence 130 are written in different languages correspond to similar pieces of language-independent information 120. Thus, the language-independent information 120 is used as a medium to connect the source sentence 110 and the target sentence 130 written in different languages, and the machine translation apparatus uses the language-independent information 120 to translate the source sentence 110 in the first language into the target sentence 130 in the second language.

The machine translation apparatus uses a neural network to convert the source sentence 110 to the language-independent information 120 and convert the language-independent information 120 to the target sentence 130. A process of converting the source sentence 110 to the language-independent information 120 and converting the language-independent information 120 to the target sentence 130 using the neural network will be further described with reference to FIGS. 2, 3, and 4.

Figure 2:
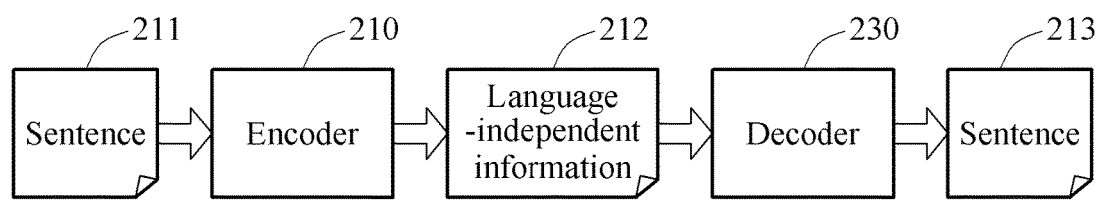
FIG. 2 illustrates an example of an operation of each of an encoder and a decoder.

FIG. 2 illustrates an example of an operation of each of an encoder 210 and a decoder 230.

FIG. 2 illustrates the encoder 210 and the decoder 230 for a predetermined language. Each of the encoder 210 and the decoder 230 includes a neural network.

The encoder 210 encodes a sentence 211 written in a first language to convert the sentence 211 to language-independent information 212 corresponding to the sentence 211. A sentence is, for example, a text type of language data. For example, the encoder 210 extracts abstracted information (for example, a feature vector) from the sentence 211 through encoding, and generates the language-independent information 212 mapped to the abstracted information.

The encoder 210 includes a recurrent neural network (RNN) as a neural network to convert the sentence 211 to the language-independent information 212. To output an image as the language-independent information 212, the encoder 210 includes a deep recurrent attentive writer (DRAW) neural network as an RNN for image output.

The decoder 230 decodes the language-independent information 212 to convert the language-independent information 212 to a sentence 213 in a second language corresponding to the language-independent information 212. For example, the decoder 230 extracts abstracted information (for example, a feature vector) from the language-independent information 212 through decoding, and generates the sentence 213 mapped to the abstracted information.

The decoder 230 includes a neural network to convert the language-independent information 212 to the sentence 213. The neural network includes, for example, a neural network based on neural image caption generation with visual attention, known as show, attend, and tell.

Figure 3:
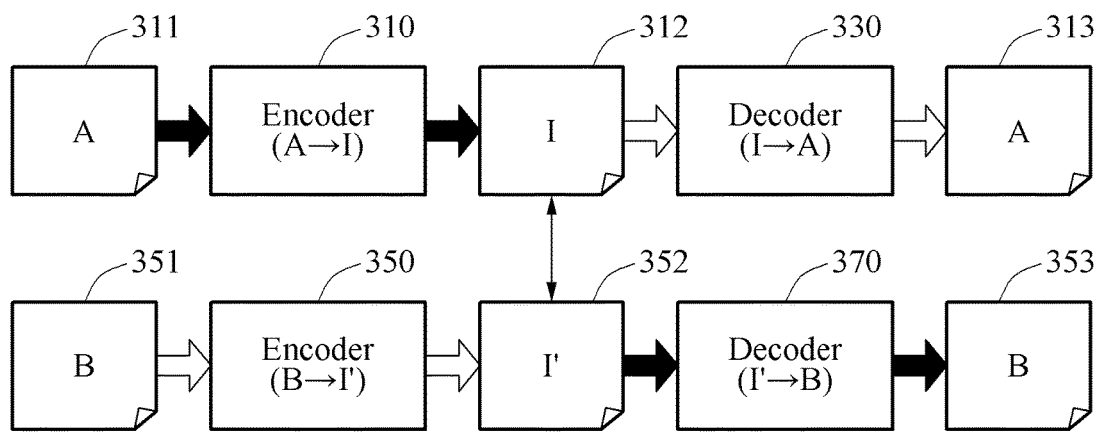
FIG. 3 illustrates an example of a machine translation process to translate a source sentence into a target sentence.

FIG. 3 illustrates an example of a machine translation process to translate a source sentence into a target sentence.

FIG. 3 illustrates an encoder 310 for a first language, a decoder 330 for the first language, an encoder 350 for a second language and a decoder 370 for the second language.

The encoder 310 encodes a sentence A 311 written in the first language to convert the sentence A 311 to language-independent information I 312. The decoder 330 decodes the language-independent information I 312 to convert the language-independent information I 312 to a sentence A 313 written in the first language.

The encoder 350 encodes a sentence B 351 written in the second language to convert the sentence B 351 to language-independent information I' 352. The decoder 370 decodes the language-independent information I' 352 to convert the language-independent information I' 352 to a sentence B 353 written in the second language.

When the language-independent information I 312 output by the encoder 310 is similar to the language-independent information I' 352 output by the encoder 350, the sentence A 311 and the sentence B 353, respectively corresponding to the language-independent information I 312 and the language-independent information I' 352, express the same or similar meanings in different languages.

For example, when a similarity between the language-independent information I 312 and the language-independent information I' 352 is higher than a preset threshold, the sentence A 311 is converted to the sentence B 353 using the encoder 310 that encodes the sentence A 311 to convert the sentence A 311 to the language-independent information I 312, and the decoder 370 that decodes the language-independent information I' 352 to convert the language-independent information I' 352 to the sentence B 353. Thus, a machine translation is performed to convert the sentence A 311 to the sentence B 353 using the encoder 310 and the decoder 370.

The similarity is information about a degree to which the language-independent information I 312 is similar to the language-independent information I' 352, and is determined based on various schemes, for example, a mean square error, a Euclidean distance, or a Kullback-Leibler divergence. For example, when the language-independent information I 312 and the language-independent information I' 352 include images, the similarity is determined based on a difference between pixel values of each of the images of the language-independent information I 312 and pixel values of each of the images of the language-independent information I' 352.

A process of training the encoder 310 is performed in advance so that the encoder 310 encodes the sentence A 311 to convert the sentence A 311 to language-independent information I 312 that is identical to the language-independent information I' 352 or that has a similarity to the language-independent information I' 352 higher than the threshold. The training of the encoder 310 may include determining of weights or parameters of a neural network in the encoder 310.

For example, parallel corpus data in the first language and the second language is used as training data. The parallel corpus data is data including a language data pair of different languages, and includes, for example, a pair of a training sentence (for example, a source sentence) written in the first language and a training sentence (for example, a target sentence) written in the second language and corresponding to the training sentence written in the first language. In the following description, the training sentence written in the first language and the training sentence written in the second language are referred to as a "first training sentence" and a "second training sentence," respectively.

The encoder 310 is trained so that training language-independent information that is output by encoding the first training sentence in the encoder 310 corresponds to information that is output by encoding the second training sentence in the encoder 350. For example, the encoder 310 is trained so that a similarity between the training language-independent information output from the encoder 310 and the information output from the encoder 350 is higher than the threshold.

For example, when the encoder 310 is trained to output the same training language-independent information as the training language-independent information output from the encoder 350, the decoder 370 decodes the training language-independent information output from the encoder 310 and outputs the second training sentence.

In addition, the decoder 370 is trained. For example, the decoder 370 is trained to decode the training language-independent information output from the encoder 310 and output the second training sentence.

The decoder 370 is trained by fine tuning as described above, and thus it is possible to effectively enhance an accuracy of the machine translation using the encoder 310 and the decoder 370.

Also, the encoder 310 is additionally trained. For example, the encoder 310 is additionally trained so that the second training sentence is output from the decoder 370 in response to the decoder 370 decoding the training language-independent information output from the encoder 310.

The encoder 310 is additionally trained by fine tuning as described above, and thus it is possible to effectively enhance the accuracy of the machine translation using the encoder 310 and the decoder 370.

The machine translation process of translating the sentence A 311 of the first language into the sentence B 353 of the second language has been described above, but the machine translation process is not limited thereto. For example, the machine translation process is also applicable to a machine translation process of translating the sentence B 351 of the second language into the sentence A 313 of the first language using the encoder 350 and the decoder 330. Thus, further description of the machine translation process of translating the sentence B 351 into the sentence A 313 has been omitted.

Figure 4:
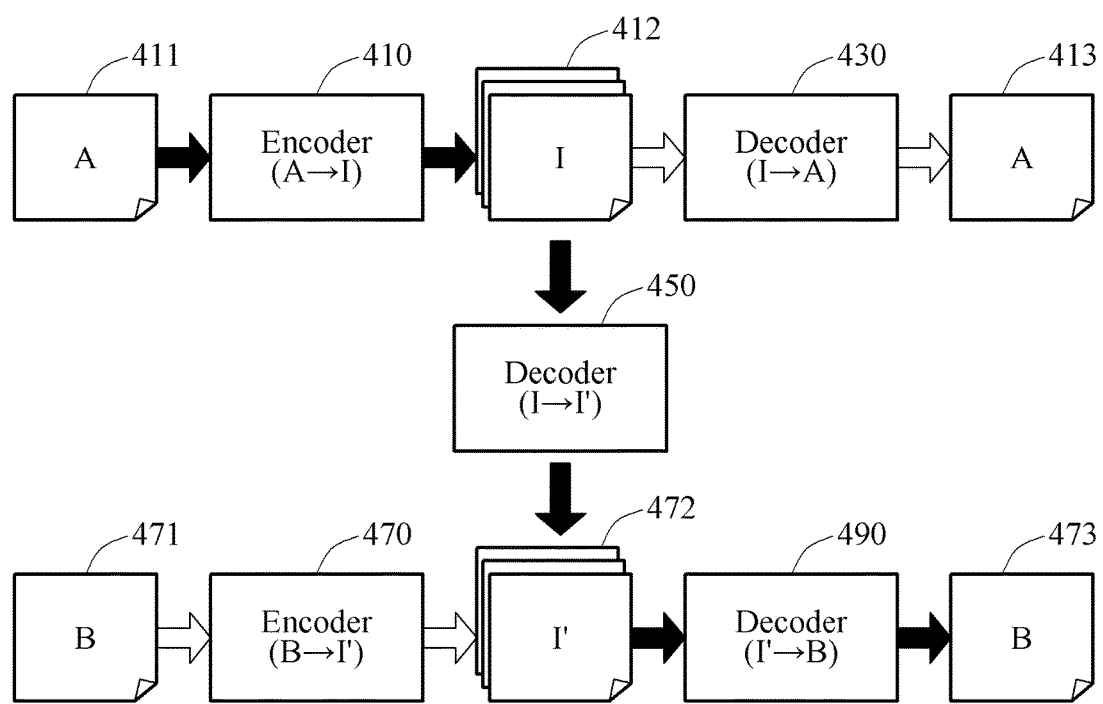
FIG. 4 illustrates another example of a machine translation process to translate a source sentence into a target sentence.

FIG. 4 illustrates another example of a machine translation process to translate a source sentence into a target sentence.

FIG. 4 illustrates an encoder 410 for a first language, a decoder 430 for the first language, a decoder 450 for language-independent information, an encoder 470 for a second language and a decoder 490 for the second language.

The encoder 410 encodes a sentence A 411 written in the first language to convert the sentence A 411 to first language-independent information I 412. For example, the encoder 410 encodes the sentence A 411 to obtain the first language-independent information I 412 corresponding to the sentence A 411. The decoder 430 decodes the first language-independent information I 412 to convert the first language-independent information I 412 to a sentence A 413 written in the first language.

The encoder 470 encodes a sentence B 471 written in the second language to convert the sentence B 471 to second language-independent information I' 472. For example, the encoder 470 encodes the sentence B 471 to obtain the second language-independent information I' 472 corresponding to the sentence B 471. The decoder 490 decodes the second language-independent information I' 472 to convert the second language-independent information I' 472 to a sentence B 473 written in the second language.

The first language-independent information I 412 includes, for example, a set, a permutation, or a structured form of any one or any combination of any two or more of audio, video, brainwaves, and images corresponding to the sentence A 411. For example, referring back to FIG. 1, the language-independent information 120 includes a set of a plurality of images corresponding to the source sentence 110. Similarly, the second language-independent information I' 472 includes, for example, a set, a permutation, or a structured form of any one or any combination of any two or more of audio, video, brainwaves, and images corresponding to the sentence B 471.

Unlike the example of FIG. 3, the decoder 450 is additionally provided in the example of FIG. 4. The decoder 450 decodes the first language-independent information I 412 to convert the first language-independent information I 412 to the second language-independent information I' 472. For example, the decoder 450 decodes the first language-independent information I 412 to obtain the second language-independent information I' 472.

For example, the second language-independent information I' 472 output by decoding the first language-independent information I 412 in the decoder 450 corresponds to language-independent information output by encoding the sentence B 471 in the encoder 470. In this example, when the sentence B 471 corresponds to a target sentence generated by translating the sentence A 411, the decoder 490 decodes the second language-independent information I' 472 to obtain the sentence B 473 corresponding to the sentence A 411.

Thus, the sentence A 411 in the first language is converted to the sentence B 473 in the second language using the encoder 410, the decoder 450, and the decoder 490. A machine translation is performed to convert the sentence A 411 in the first language to the sentence B 473 in the second language using the encoder 410, the decoder 450, and the decoder 490.

A process of training the decoder 450 is performed in advance so that the decoder 450 decodes the first language-independent information I 412 to convert the first language-independent information I 412 to the second language-independent information I' 472. The training of the decoder 450 may include determining weights or parameters of a neural network in the decoder 450.

For example, parallel corpus data in the first language and the second language is used as training data. The parallel corpus data is data including a language data pair of different languages. The language data pair includes, for example, a pair of a first training sentence and a second training sentence corresponding to the first training sentence.

The decoder 450 is trained to output second training language-independent information in response to an input of first training language-independent information output by encoding the first training sentence included in the parallel corpus data in the encoder 410. The first training language-independent information is associated with the first language. The second training language-independent information is associated with the second language, and is output by encoding the second training sentence included in the parallel corpus data in the encoder 470.

Also, the encoder 410 and the decoder 490 are trained. The encoder 410 is trained to output the second training language-independent information in response to the decoder 450 decoding the first training language-independent information output by the encoder 410 in encoding the first training sentence. The second training language-independent information is, for example, information output by encoding the second training sentence in the encoder 470.

The decoder 490 is trained to output the second training sentence in response to receiving the second training language-independent information output by the decoder 450 in decoding the first training language-independent information.

The encoder 410 and the decoder 490 are additionally trained by fine tuning as described above, and thus it is possible to effectively enhance an accuracy of the machine translation using the encoder 410, the decoder 450, and the decoder 490.

The machine translation process of translating the sentence A 411 of the first language into the sentence B 473 of the second language has been described above, but the machine translation process is not limited thereto. For example, the machine translation process is also applicable to a machine translation process of translating the sentence B 471 of the second language into the sentence A 413 of the first language using the encoder 470, the decoder 450 and the decoder 430. That is, the decoder 450 may be a bidirectional decoder 450 that converts the first language-independent information I 412 into the second language-independent information I' 472, and converts the second language-independent information I' 472 into the first language-independent information I 412. Thus, further description of the machine translation process of translating the sentence B 471 into the sentence A 413 has been omitted.

Figure 5:
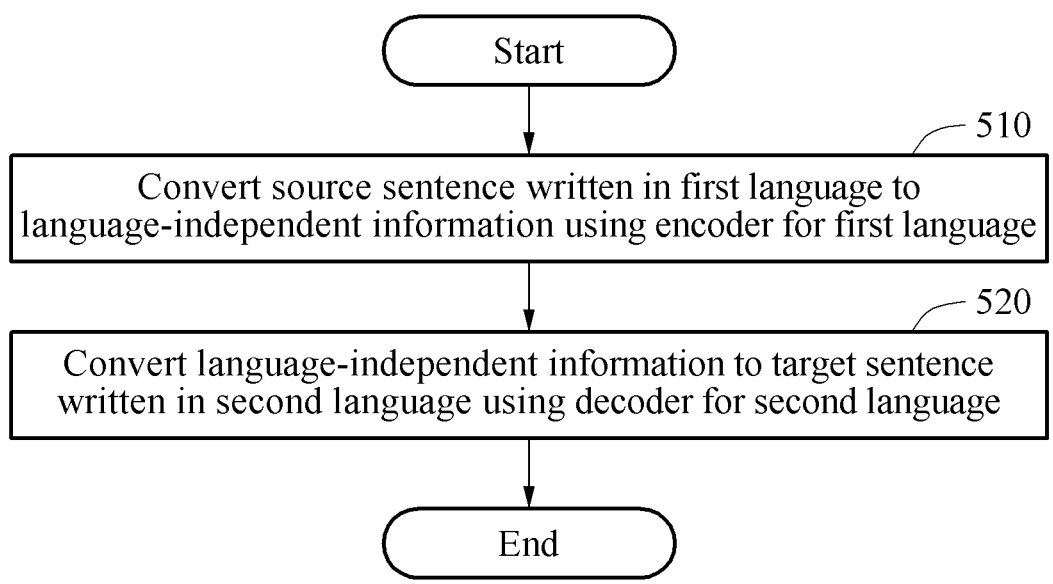
FIG. 5 is a flowchart illustrating an example of a machine translation method.

FIG. 5 is a flowchart illustrating an example of a machine translation method.

The machine translation method of FIG. 5 is performed by one or more processors included in a machine translation apparatus.

Referring to FIG. 5, in operation 510, the machine translation apparatus converts a source sentence written in a first language to language-independent information using an encoder for the first language. The machine translation apparatus encodes the source sentence to convert the source sentence to the language-independent information using the encoder for the first language. The encoder for the first language is trained to output language-independent information corresponding to a target sentence written in a second language in response to an input of the source sentence. The first language and the second language are different from each other.

The machine translation apparatus converts the source sentence to language-independent information having a similarity to the language-independent information corresponding to the target sentence higher than a preset threshold.

In operation 520, the machine translation apparatus converts the language-independent information to the target sentence corresponding to the source sentence using a decoder for the second language. The machine translation apparatus decodes the language-independent information to convert the language-independent information to the target sentence using the decoder for the second language.

To perform the machine translation method of FIG. 5, the encoder for the first language is trained in advance. The encoder for the first language is trained to encode a first training sentence included in parallel corpus data in the first language and the second language to convert the first training sentence to training language-independent information. The training language-independent information corresponds to training language-independent information that is output by encoding a second training sentence included in the parallel corpus data in an encoder for the second language. For example, the encoder for the first language is trained to output training language-independent information having a similarity to the information that is output by encoding the second training sentence in the encoder for the second language higher than a preset threshold.

Also, the decoder for the second language is trained. For example, the decoder for the second language is trained to output the second training sentence corresponding to the first training sentence in response to an input of the training language-independent information from the encoder for the first language.

The description of FIGS. 1 through 4 is also applicable to the machine translation method of FIG. 5, and accordingly is not repeated here.

Figure 6:
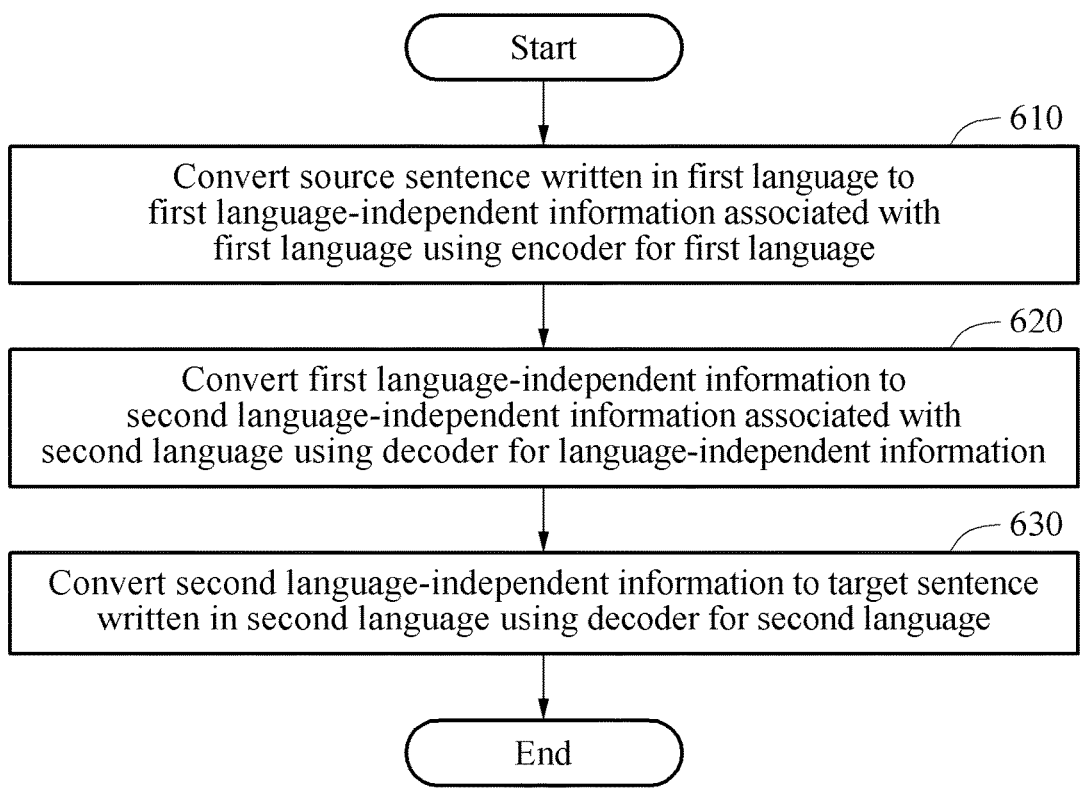
FIG. 6 is a flowchart illustrating another example of a machine translation method.

FIG. 6 is a flowchart illustrating another example of a machine translation method.

The machine translation method of FIG. 6 is performed by one or more processors included in a machine translation apparatus.

Referring to FIG. 6, in operation 610, the machine translation apparatus converts a source sentence written in a first language to first language-independent information associated with the first language using an encoder for the first language. The machine translation apparatus encodes the source sentence and converts the source sentence to the first language-independent information using the encoder for the first language. The first language-independent information includes, for example, a set, a permutation or a structured form of any one or any combination of any two or more of audio, video, brainwaves, and images corresponding to the source sentence.

In operation 620, the machine translation apparatus converts the first language-independent information to second language-independent information associated with a second language using a decoder for language-independent information. The second language is different from the first language. The second language-independent information corresponds to language-independent information output by encoding a target sentence written in the second language in an encoder for the second language.

In operation 630, the machine translation apparatus converts the second language-independent information to the target sentence corresponding to the source sentence. The machine translation apparatus decodes the second language-independent information and converts the second language-independent information to the target sentence using a decoder for the second language.

To perform the machine translation method of FIG. 6, the decoder for language-independent information is trained in advance. The decoder for language-independent information is trained to output the second training language-independent information in response to an input of the first training language-independent information. The first training language-independent information is, for example, information output by encoding a first training sentence included in parallel corpus data in the first language and the second language in the encoder for the first language. Also, the second training language-independent information is, for example, information output by encoding a second training sentence included in the parallel corpus data in the encoder for the second language.

The description of FIGS. 1 through 4 is also applicable to the machine translation method of FIG. 6, and accordingly is not repeated here.

Figure 7:
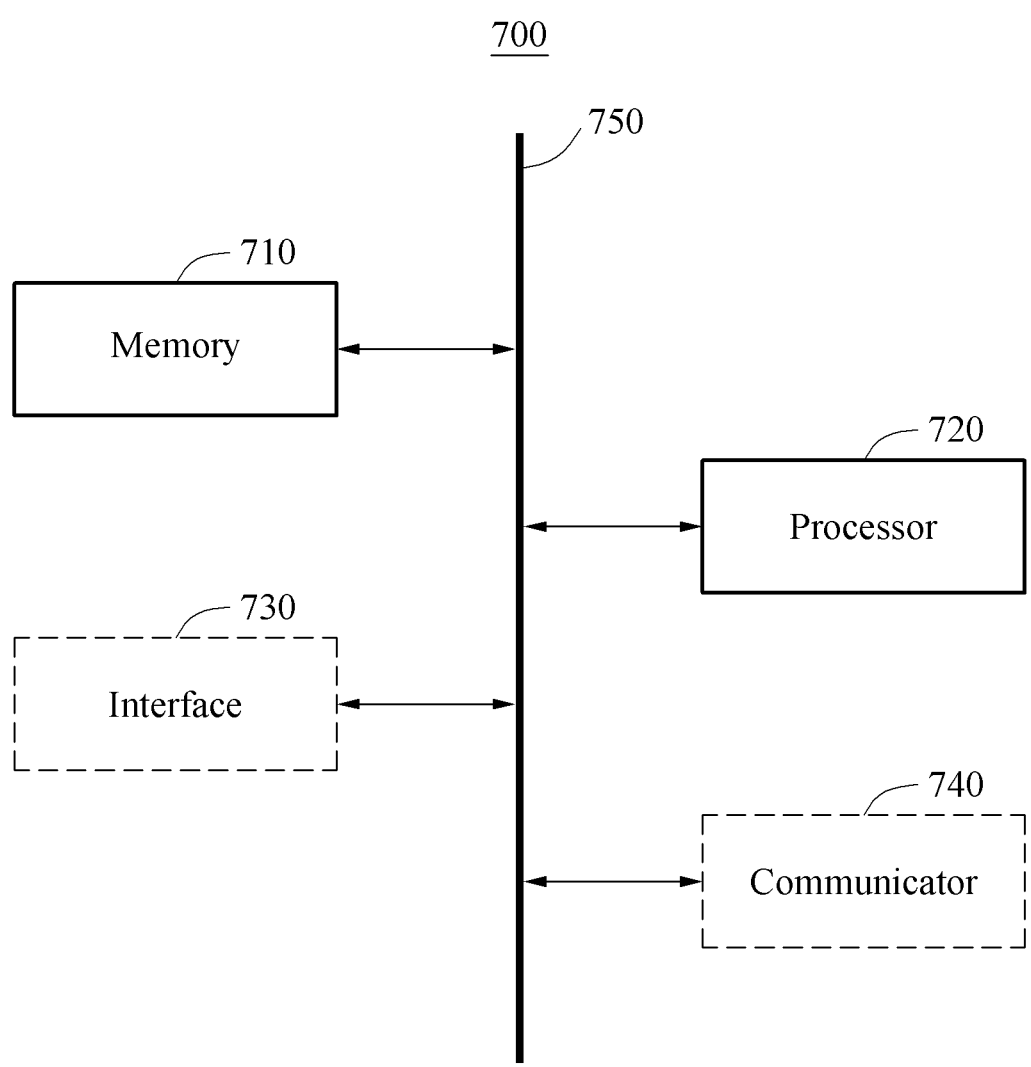
FIG. 7 illustrates an example of a machine translation apparatus.

FIG. 7 illustrates an example of a machine translation apparatus 700.

Referring to FIG. 7, the machine translation apparatus 700 includes a memory 710, a processor 720, an interface 730, and a communicator 740. The memory 710, the processor 720, the interface 730, and the communicator 740 exchange data with each other via a bus 750.

The memory 710 includes, for example, a volatile memory and a nonvolatile memory, and stores information received via the bus 750. The memory 710 stores neural networks for an encoder for a first language and a decoder for a second language. Each of the neural networks is stored as an executable object file or an execution file in the memory 710. Also, parameters for each of the neural networks are stored in the memory 710.

The processor 720 loads neural networks from the memory 710 and applies parameters corresponding to each of the neural networks to implement the encoder for the first language and the decoder for the second language.

In one example, the processor 720 converts a source sentence written in the first language to language-independent information using the encoder for the first language, and converts the language-independent information to a target sentence using the decoder for the second language. In this example, the target sentence corresponds to the source sentence and is written in the second language. The encoder for the first language is trained to output language-independent information corresponding to the target sentence in response to an input of the source sentence.

In another example, the processor 720 converts a source sentence written in the first language to first language-independent information using the encoder for the first language, converts the first language-independent information to second language-independent information using a decoder for language-independent information, and converts the second language-independent information to a target sentence using the decoder for the second language. In this example, the target sentence corresponds to the source sentence and is written in the second language.

The machine translation apparatus 700 receives, as an input, a source sentence written in the first language from a user through the interface 730. In one example, the interface 730 is a device configured to receive an input of the sentence written in the first language from the user, and may be, for example, a keypad included in the machine translation apparatus 700 or a virtual keypad displayed on a display of the machine translation apparatus 700.

In another example, the interface 730 includes a microphone configured to receive a voice signal pronounced by a user. The voice signal received by the microphone is in the first language, and the machine translation apparatus 700 recognizes a sentence written in the first language from the voice signal using a voice recognition scheme, and the sentence is translated into a sentence written in the second language through a machine translation.

The machine translation apparatus 700 may receive a sentence written in the first language for a machine translation from an external device via the communicator 740. The machine translation apparatus 700 translates the sentence written in the first language into the second language through the machine translation, and transfers a machine translation result to the external device via the communicator 740.

Also, the machine translation apparatus 700 may receive a voice signal of a user from the external device via the communicator 740. The machine translation apparatus 700 recognizes a sentence written in the first language from the voice signal, and transfers a machine translation result obtained by translating the sentence written in the first language into the second language to the external device via the communicator 740.

The machine translation apparatus 700 has been described based on a machine translation process of translating a sentence written in the first language into a sentence written in the second language, but the machine translation apparatus 700 is not limited thereto. For example, the description of the machine translation apparatus 700 is also applicable to a machine translation process of translating a sentence written in the second language into a sentence written in the first language using an encoder for the second language and a decoder for the first language.

The machine translation apparatus 700 performs at least one method described above with reference to FIGS. 1 through 6.

According to examples described above, a machine translation is performed to translate a source sentence written in a first language into a target sentence written in a second language using language-independent information as a medium, and thus it is possible to increase an accuracy of the machine translation between the two languages despite insufficient parallel corpus data in the two languages.

Also, according to examples described above, both an encoder for a first language and a decoder for a second language may be trained by fine tuning, and thus it is possible to effectively enhance an accuracy of a machine translation based on language-independent information.

The encoder 210 and the decoder 130 illustrated in FIG. 2, the encoder 310, the decoder 330, the encoder 350, and the decoder 370 illustrated in FIG. 3, the encoder 410, the decoder 430, the decoder 450, the encoder 470, and the decoder 473 illustrated in FIG. 4, and the memory 710, the processor 720, the interface 730, and the communicator 740 illustrated in FIG. 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A machine translation method comprising:
converting, using a processor, a source sentence written in a first language to language-independent information using an encoder for the first language, information for which is stored in non-volatile and volatile memory; and
converting, using the processor, the language-independent information to a target sentence corresponding to the source sentence and written in a second language different from the first language using a decoder for the second language, information for which is stored in the nonvolatile and volatile memory, in response to a similarity being higher than a preset threshold, wherein the similarity is determined from a comparison between pixel values of the language-independent information of the source sentence and pixel values of the language-independent information of the target sentence;
wherein the encoder for the first language is trained to output language-independent information corresponding to the target sentence in response to an input of the source sentence, using the processor, wherein the processor communicates with the nonvolatile and volatile memory via a bus.

2. The machine translation method of claim 1, wherein the converting of the source sentence to the language-independent information comprises converting the source sentence to language-independent information having a similarity to the language-independent information corresponding to the target sentence higher than a preset threshold.

3. The machine translation method of claim 1, wherein the encoder for the first language is further trained to encode a first training sentence included in parallel corpus data in the first language and the second language to output training language-independent information; and
the training language-independent information corresponds to information output by encoding a second training sentence included in the parallel corpus data in an encoder for the second language, the second training sentence corresponding to the first training sentence.

4. The machine translation method of claim 3, wherein the decoder for the second language is trained to output the second training sentence in response to an input of the training language-independent information from the encoder for the first language.

5. The machine translation method of claim 1, wherein the language-independent information to which the source sentence is converted comprises any one or any combination of audio, video, brainwaves, and images corresponding to the source sentence.

6. The machine translation method of claim 1, wherein the encoder for the first language and the decoder for the second language are implemented by one or more processors.

7. A non-transitory computer-readable storage medium storing instructions that, when executed by the processor, cause the processor to perform the method of claim 1.

8. A machine translation method comprising:
converting, using a processor, a source sentence written in a first language to first language-independent information associated with the first language using an encoder for the first language, information for which is stored in nonvolatile and volatile memory;
converting, using the processor, the first language-independent information to second language-independent information associated with a second language different from the first language using a decoder for language-independent information, information for which is stored in the nonvolatile and volatile memory, in response to a similarity being higher than a preset threshold, wherein the similarity is determined from a comparison between pixel values of the language-independent information of the source sentence and pixel values of the language-independent information of the target sentence; and
converting the second language-independent information to a target sentence corresponding to the source sentence and written in the second language using a decoder for the second language, using the processor, wherein the processor communicates with the nonvolatile and volatile memory via a bus.

9. The machine translation method of claim 8, wherein the second language-independent information corresponds to language-independent information output by encoding the target sentence in an encoder for the second language.

10. The machine translation method of claim 8, wherein the decoder for language-independent information is trained to output second training language-independent information associated with the second language in response to an input of first training language-independent information associated with the first language, the second training language-independent information corresponding to the first training language-independent information;
the first training language-independent information is language-independent information output by encoding a first training sentence included in parallel corpus data in the first language and the second language in the encoder for the first language; and
the second training language-independent information is language-independent information output by encoding a second training sentence included in the parallel corpus data in an encoder for the second language, the second training sentence corresponding to the first training sentence.

11. The machine translation method of claim 8, wherein the first language-independent information comprises a set, a permutation or a structured form of any one or any combination of any two or more of audio, video, brainwaves, and images corresponding to the source sentence.

12. The machine translation method of claim 8, wherein the encoder for the first language, the decoder for language-independent information, and the decoder for the second language are implemented by one or more processors.

13. A machine translation apparatus comprising:
a nonvolatile and volatile memory storing information to implement an encoder for a first language and a decoder for a second language different from the first language; and
a processor configured to communicate with the nonvolatile and volatile memory via a bus, implement the encoder for the first language and the decoder for the second language based on the information stored in the memory, and translate a source sentence written in the first language into a target sentence written in the second language using the encoder for the first language and the decoder for the second language;

wherein the processor is further configured to convert the source sentence to language-independent information using the encoder for the first language, and convert the language-independent information to the target sentence using the decoder for the second language, in response to a similarity being higher than a preset threshold, wherein the similarity is determined from a comparison between pixel values of the language-independent information of the source sentence and pixel values of the language-independent information of the target sentence; and the encoder for the first language is trained, using the processor, to output language-independent information corresponding to the target sentence in response to an input of the source sentence.

14. The machine translation apparatus of claim 13, wherein the processor is further configured to convert the source sentence to language-independent information having a similarity to the language-independent information corresponding to the target sentence higher than a preset threshold.

15. The machine translation apparatus of claim 13, wherein the encoder for the first language is further trained to encode a first training sentence included in parallel corpus data in the first language and the second language to output training language-independent information; and the training language-independent information corresponds to language-independent information output by encoding a second training sentence included in the parallel corpus data in an encoder for the second language, the second training sentence corresponding to the first training sentence.

16. The machine translation apparatus of claim 15, wherein the decoder for the second language is trained to output the second training sentence corresponding to the first training sentence in response to an input of the training language-independent information from the encoder for the first language.

17. The machine translation apparatus of claim 13, wherein the language-independent information to which the source sentence is converted comprises any one or any combination of any two or more of audio, video, brainwaves, and images corresponding to the source sentence.

18. The machine translation apparatus of claim 13, wherein the information stored in the memory comprises:
    a first neural network for the encoder for the first language;
    a second neural network for the decoder for the second language;
    first parameters for the first neural network; and
    second parameters for the second neural network;
    wherein the processor is further configured to implement the encoder for the first language based on the first neural network and the first parameters, and implement the encoder for the second language based on the second neural network and the second parameters.

19. The machine translation apparatus of claim 18, wherein each of the first neural network and the second neural network is stored in the memory as an executable object file or an execution file.

20. The machine translation apparatus of claim 13, wherein the decoder for the second language is a bidirectional decoder that converts the language-independent information into second language-independent information of the second language, and convert the second language-independent information into the language-independent information of the first language.

* * * * *